May 15, 1928.
R. THAYER
1,669,430
CENTRIFUGAL AMALGAMATOR
Filed May 1, 1922
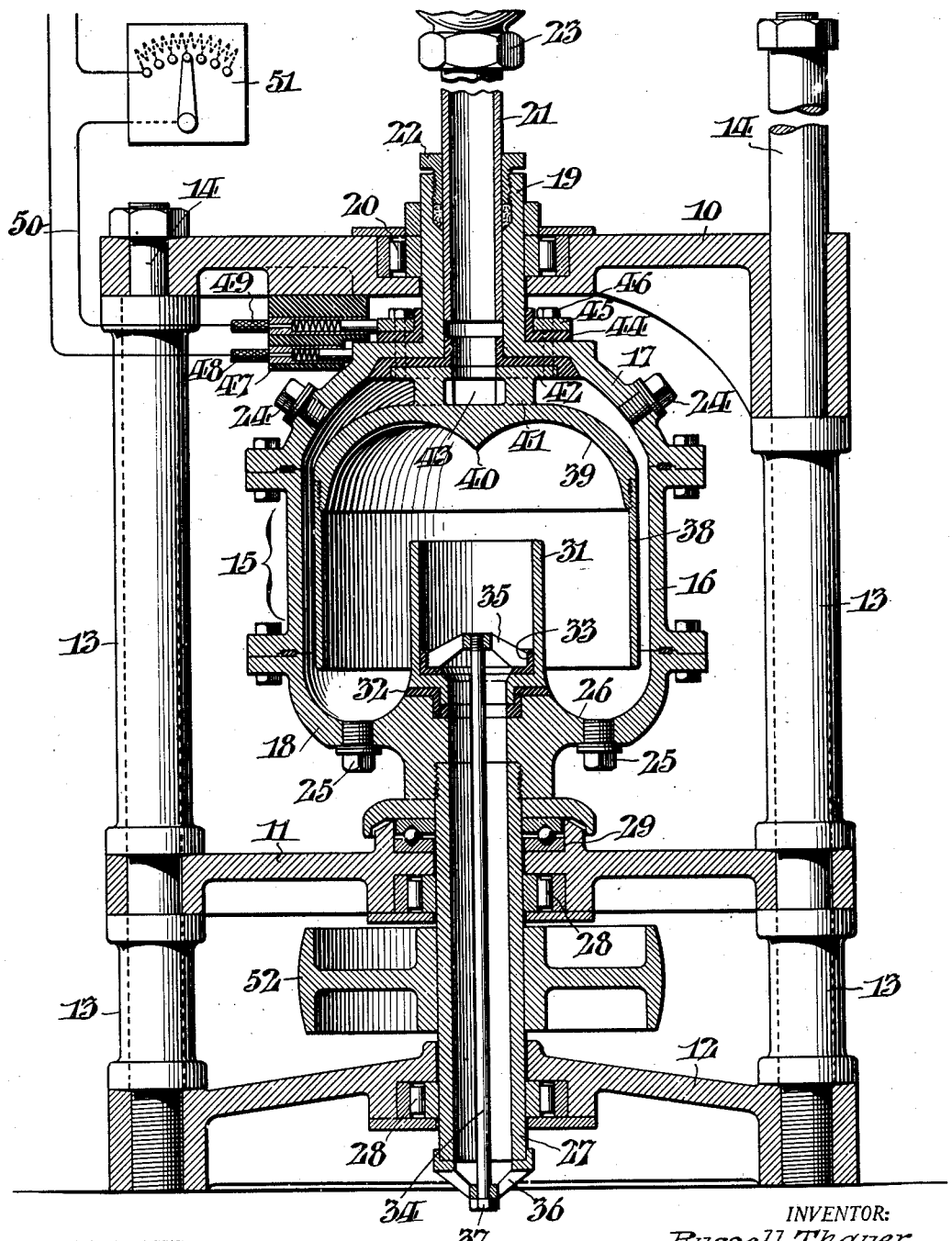
WITNESSES:
John E. Bergner
Alfred E. Ischinger
INVENTOR:
Russell Thayer,
BY Fraley Paul
ATTORNEYS.

Patented May 15, 1928.

1,669,430

UNITED STATES PATENT OFFICE.

RUSSELL THAYER, OF PHILADELPHIA, PENNSYLVANIA.

CENTRIFUGAL AMALGAMATOR.

Application filed May 1, 1922. Serial No. 557,541.

My invention relates to the recovery of values from metalliferous pulp and other suspensions or solutions containing such values, by methods of centrifugal and what may be termed "electrolytic" treatment, preferably with the aid of mercury as a receptive medium for the initial extraction of the values. By my invention, such precious metals as gold, silver, and the entire group of platinum metals—including platinum, iridium, palladium, rhodium, ruthenium, osmium, and iridosmine—can be commercially recovered in a highly efficient and convenient manner. In particular, gold in such hitherto troublesome, unamalgamable states as are commonly termed "float", "rusty" and "greasy" gold can be recovered very easily by my methods. Amalgamable metals, such as gold, silver, mercury, etc., can be amalgamated with the mercury (if mercury be employed) and subsequently separated from it by distillation; and non-amalgamable metals, such as those of the platinum group, can nevertheless be entrained in or united with the mercury so as to be temporarily retained by it. In this latter case, as a rule, the separation can very easily be effected mechanically, without necessarily resorting to distillation.

As regards the pulp or the like, I have discovered that in the centrifuging operation the centrifugal distribution and concentration of value particles over the surrounding peripheral wall can be so effectively reinforced and aided by concurrent electrolysis as to give substantially complete extraction of all the values in the pulp. In the case of very fine free metallic values (either in the so-called suspensoid state, or in colloidal solution or suspension), passage of electric current the right way through the pulp "breaks" the suspension and acts to precipitate the free value particles in the centrifugal direction; and in the case of values chemically combined (as are the gold and silver in solution in sea water, for example), the electric current reduces them and carries or precipitates the metallic particles in the centrifugal direction electrochemically. In all cases, therefore, the electrolysis tends to make the centrifugal precipitation of values more effective and more complete i. e., values are concurrently and correspondingly centrifuged and electrically precipitated (or "electrodeposited") on the cathode from throughout the centrifugally applied pulp or the like.

As regards the use of mercury as above referred to, I have discovered that by an electric current it can be activated and given an affinity for ordinarily unamalgamable metals like platinum which it does not by itself possess, and that its amalgamation with gold (even in the various resistant states of the latter) and with other amalgamable metals can be stimulated and hastened. Also, the mercury can be kept healthy, bright and free from scum, and prevented from "flouring", as it is termed. However, while my process of combined centrifuging and electrical precipitation enhances the advantages of using mercury as a receptive medium on the peripheral electrode wall employed,—prominent amongst which is the great ease with which values of all sorts can be separated and recovered from mercury,—yet such use of mercury is not essential, since a bare metallic wall is rendered retentive for such values (even in the total absence of mercury) by centrifugal force, and since a plating of values on such a wall can be removed or recovered.

In the preferred mode of carrying out my invention (hereinafter described in detail), I make the mercury the active or exposed cathode surface for the electrolysis of the pulp or the like. For this purpose, I centrifugally distribute the mercury over the interior of a hollow cathode member that also serves as peripheral wall for the centrifuging of the pulp, and is appropriately formed or arranged to retain the values centrifugally dispelled from the pulp, as well as the mercury. Thus the pulp is centrifugally applied and distributed in a thin stream over a thin centrifugally maintained layer of mercury, and the values correspondingly precipitated and accumulated. With a correspondingly arranged or "distributed" internal anode within the pulp stream, substantially overlapping the cathode wall in closely spaced relation thereto, the active cathode surface can be made very uniformly effective as such, and the high recovery of values indicated above fully realized.

Coalescent or absorptive action of the mercury for all the various metals indicated above can be very adequately evoked or enhanced by the flow of current required for effective electrolysis,—and vice-versa. Hence it is not necessary to resort to such expedients as enrichment of the mercury with sodium for the purpose of securing amalgamation of metals (like platinum) not ordinarily amalgamable; and it is, of course, much simpler and more convenient not to do so. In practice, I have found, it is advantageous to electrolyze and centrifuge the pulp stream and the mercury under hydrostatic pressure.

For the purpose of carying on my process conveniently and efficiently, I have devised a novel apparatus in the nature of a centrifugal amalgamator, a preferred embodiment of which is hereinafter illustrated and described.

In the accompanying drawing, wherein I have illustrated a view in vertical section of a centrifugal ore separator constructed in accordance with my invention, 10, 11, and 12 indicate the upper, intermediate and lower members respectively of a frame, maintained in spaced relation by interposed sleeves 13, and held together by bolts 14 passing through the frame members and sleeves. One of the bolts shown is longer than the other and projects upwardly to provide a post around which the upper frame member 10 may be swung when the other bolt is disengaged therefrom, to permit access to the parts enclosed by the frame members. This arrangement is arbitrary and may be altered to conform to conditions met with in practice, being suggested here only as an expedient to support the essential elements of the separator. This latter consists of a rotary casing or centrifugal 15 in the form of a drum, which is positioned between the upper and intermediate frame members, and, as shown, is preferably of a separable construction, comprising a vertical flanged tubular section 16 capped at its upper end by means of a flanged closure member 17 and at its lower end by a flanged closure plate 18. The closure or cover 17 has a central apertured boss 19 constituting a journal or hollow spindle, which runs in an antifriction bearing 20 and receives the lower end of a pulp feeding pipe 21, a conventional form of packing gland 22 being provided to prevent the leakage of material between the rubbing surfaces of the boss and feed pipe. A valve the lower portion only of which is indicated in the drawings at 23 is interposed in the line 21 and functions as a pressure control for a purpose to be presently explained.

In operation, pulp or the like may be fed in under pressure (regulated by the valve at 23) through the axial pipe 21 as intake, and may leave through an axial outlet 27 to be presently described. From the inlet 21, the pulp passes down in a thin stream through the narrow annular space between the peripheral outer wall or cathode member 15 and an internal anode and deflecting member or structure 38, 39, mounted across the intake 21 to distribute the pulp, finally rising over the inner edge of an upstanding inward extension 31 (so to term it) of the outlet 27. The lower portion of the casing 15 forms a supply trough 26 for mercury,—which, when the casing is at rest, is excluded from the outlet 27 by its upstanding portion 31. In operation, a thin film of mercury from the trough 26 is centrifugally spread and maintained over the interior of the cathode wall 15 (especially the cylindrical portion 16) to serve as its active surface, as a result of the rapid rotation. The annular space between the electrodes 15 and 38 affords free, unobstructed passage for the pulp all the way down past the very lower edge of the member 38, so that the pulp may flow through in a smooth, even stream and sweep refuse clear of the electrodes,—without checks or eddies that might cause refuse to settle out and eventually block the passage. Likewise, the continuous, unbroken pulp stream has no tendency to mingle with, ruffle, or disturb the centrifugally distributed layer of mercury on the cathode side of the passage.

Recurring, now, to the arrangement and construction of the apparatus, it will be seen that the intermediate section 16 and the end members 17 and 18 of the main casing or body 15 of the centrifugal are held in proper relation by means of bolts which clamp together the meeting flanges of the parts. If desired, gaskets may be introduced between the flanged ends of these parts to ensure a tight joint. Openings in the cap 17 (which are normally closed by removable plugs 24) permit of the introduction of material into the drum casing or centrifugal, 15, which can be drained through openings formed in the lower cap 18 and normally closed by plugs 25; or, if desired, pet cocks may be utilized in lieu thereof. As shown, the inner face of the lower cap 18 is preferably concaved in a deep annular groove 26 to serve as the mercury trough. The lower end of the drum casing is supported upon the central tubular shaft or spindle 27 in threaded engagement therewith, the latter running in antifriction bearings 28 mounted in the intermediate and lower frame members. An antifriction bearing 29 receives the vertical thrust of the drum casing, and is interposed between the latter and the frame member 11. The central portion of the cap 18 is recessed to support and receive the correspondingly formed end of the tubular deflector or outlet portion 31, an appropriately shaped insulating gasket 32 being interposed. An internal shoulder is formed in the deflector 31 by reduction of its diameter, to support an insulating washer 33. A rod 34 extends through the lower spindle 27, and is threadedly connected to a spider casting 35 comprising radial arms which rest on the washer 33. Said rod at its lower end enters an opening in a perforated disk or spider member 36 applied against the lower end of the spindle 27 and lapping the margins, and a nut 37 is applied to the lower end of the rod to hold together in tight engagement the several parts included between the ends of the rod. Within the centrifugal casing 15 is the dome shaped deflector and anode structure already mentioned, comprising a cylindrical tubular section 38 capped by and in threaded engagement with an inverted cup shaped member 39. The cap member 39 has a central cusp-like internal central portion thickened to provide a conical deflecting portion 40 in axial alignment with the lower spindle 27, and also an external flanged hollow neck 41 on top. The under side of the main body or casing cap 17 is recessed to receive the flanged neck 41, an insulating gasket being interposed. The neck 41 is apertured to register with the channel of the boss 19 and is bored transversely to provide intersecting passages 43 affording communication between the upper spindle 21 and the interior of the centrifugal. A disk 44 of insulating material is applied and fixed to the outer side of the upper casing cap 17, and carries a concentric commutator ring 45, which is electrically connected to the deflector member 39 by bolts 46 which run in insulated relation through openings in the cap 17 as shown in the drawing. A support 47 of insulating material is fixed in any suitable manner upon the upper frame member 10 and carries a pair of spring pressed brushes 48 and 49 designed to wipe, respectively, the outer surface of the upper cap 17 and the ring 45, said brushes being connected to and fed through leads 50, one of which has a rheostat 51 interposed therein. A pulley wheel 52 is fixed to the lower spindle 27, and is preferably located between the lower frame members. It will be noted that the outer surface of the section 38 of the main deflector is coextensive with the surface of the drum at every point and in closely spaced relation, and that the surface of the deep groove 26 of the lower cap merges into the surface of the second deflector 31.

In the centrifugal separation of metal bearing ores, the material acted upon is in a pulverulent condition and mixed with water, constituting the pulp which contains the metals to be recovered in the form of minute particles, the segregation of which from the refuse of silica, clay, etc., composing the remainder of the pulp is the object of centrifugal treatment. The pulp, in free flowing condition, is pumped through the feed pipe 21, through the passages 43 and into the drum casing 15, flowing downward between the walls of the casing and the walls of the sections 39 and 38 of the main deflector, then inward, upward, and finally out through the second deflector 31 and the lower spindle 27, as already indicated. Previously to the passage of the pulp, a quantity of mercury is introduced into the drum casing and during rapid rotation of the latter creeps upward along the walls of the casing, and forms a coating upon said walls, as indicated above, and as usual in centrifugal amalgamators. Owing to the variance between the specific gravities of the metallic constituents of the pulp and its earthy components, the former are concentrated in the vicinity of the outer walls of the centrifugal and the platinum group of metals are instantly entrained in and held by the electrified mercurial cathode, and the gold, silver, mercury, etc., become amalgamated with the mercury.

As already intimated, the present invention contemplates the stimulation of the amalgamating process by electrolyzing the pulp stream as it flows through the apparatus, and particularly at points between the walls 16 of the drum casing and the wall 38 of the deflector, said walls being very closely spaced. To this end, a uni-directional electric current is passed into the commutator ring 45, and main deflector member, across the gap between the walls 38 and 16 bridged by the conductivity of the pulp, and through the brush 48 back to the circuit, so that the casing walls 16 or its mercurial coating may constitute the cathode and the deflector wall 38 the anode. Under the influence of the electric energy traversing the apparatus in the manner stated, the platinum, iridium, palladium, etc., are entrained in and held by the electrified mercurial cathode and the various forms of gold which are resistant to amalgamation as well as free gold are caused to amalgamate with the mercury in an instantaneous and complete manner, the action of the electric current being such as to strongly activate the entire body of the mercurial cathode as well as its mercurial surface and to create therein a strong affinity for these metals, thus breaking down all resistance possessed by them to absorption and amalgamation under ordinary circumstances. The recovery of metals in this manner is rendered more complete and efficient by passing the pulp through the apparatus under hydrostatic pressure, which may be controlled by the valve 23. I have found that hydrostatic pressure is an important element in the treatment accorded by my apparatus, as the percentage of metals recovered from a given quantity of pulp, all other conditions remaining the same, may be varied by changing the pressure through manipulation of the valve 23, and this may be adjusted with reference to the grade of ore treated, so as to effect a maximum recovery of metals. Thus, the ore bearing material is subjected to three forces in passing through the apparatus, namely: centrifugal force, electro-chemical force and hydrostatic force, all of which co-act and amplify one another to effect a complete and rapid separation, absorption and amalgamation of all the free metallic components of the pulp,—all silica, quartz, feldspar, iron etc., passing freely to the dump. Certain other advantages flow from the electrolysis of the pulp stream among which is the maintenance of a clean mercurial cathode at all times, and the prevention of flouring of the mercury,—besides, of course, the electrolytic reduction of metal value compounds.

In ordinary practice, the amalgamating surface collects particles which accumulate in the form of a scum and oxides, interfering with the continued action of the mercury. The passage of an electric current, in the manner stated clears away all scum, prevents oxidation and insures a bright, clean mercurial surface throughout the operation of the machine. It prevents the mercury from becoming "sick," as it is technically termed. Another incident in the operation of centrifugal amalgamators is the tendency of the mercury to spontaneously comminute or "flour" as the occurrence is termed, and in this condition, the amalgamating properties of the mercury are greatly reduced and much mercury is lost. The electric current as above referred to not only prevents the tendency of the element to "flour," but also increases the inherent coalescent properties of the mercury, so that the latter may be quickly restored to integration when disintegration occurs, and thus incidently prevents the loss of mercury. The loss of mercury is also prevented by reason of the specific design of the machine.

After the machine has been operated for a period sufficient for saturation of the charge of mercury contained in the drum casing or centrifugal, the mercury and amalgam are withdrawn and distilled or otherwise treated to separate the mercury from the recovered metals. The drum is again charged and the flow of pulp continued. Thus, subject to the necessity of brief stopping periods for recharging machine, the process is continuous, since as the pulp flows through continuously from the source of supply, its values are extracted and the remainder discharged as waste refuse. The passage of the electric current draws and pulls all free metals from the pulp, such metals including platinum, and its allied group, gold and silver, as well as mercury.

In order that the part played by electrolysis in my method of ore extraction may be fully realized, the attention of the reader is directed to the fact that there is a marked difference in the action of mercury on gold and the action of mercury on platinum and its allied group, under ordinary amalgamating conditions. That is to say, gold will freely amalgamate with mercury and will be held within the body of the mercury against the washing action of water used in amalgamating operations, and the resulting amalgam must be distilled in order to separate the gold from the mercury. However, platinum and its allied group does not behave in the same manner. To the contrary, platinum and its allied group of metals are particularly resistant to any amalgamating action or combination with mercury, and the particles of these metals are usually washed away unless some method is resorted to, other than amalgamation, to recover them. In carrying out my method of combined amalgamation and electrolysis, I find that platinum and its allied group of metals, when present in the pulp stream, are attracted to the mercury by reason of the strong activation of the mercury induced by the electric current; and the platinum and allied metals are not only attracted to the mercury, but are held in the body of the mercury as long as the electric current continues to flow. This is proven by the fact that when the electric current is shut off the mercury "lets go" and the occluded platinum and allied metals are released from the mercury and will wash away. Therefore to recover the platinum, etc., it is but necessary to draw off the amalgam into a pan and add water whereupon the platinum, etc., will separate from the mercury and may be recovered in the form of particles, while the gold remains amalgamated with the mercury and must be separated by distillation.

When the electric current employed is of sufficient amperage, an electro-plating of the metallic constituents upon the peripheral cathode takes place, which effect increases the segregating efficiency of the machine. In fact, this phase of the treatment is so marked that an effective rate of recovery may be obtained without the use of an amalgamating element; in lieu thereof, permitting the metallic elements of the pulp to be deposited upon the inner walls of the drum casing in the form of a plating. Or, if desired, the deposit receiving surface may be in the form of plates removably held in the casing, so as to be readily withdrawn for removal of the plating in any convenient or practicable manner. It is not necessary that the pulp be alkaline in character, in fact it may be acid, basic or saline. The pulp is usually rendered conductive to electricity by adding salt, small amounts of acid or other suitable chemicals, so that the metals, so to speak are plated upon the mercurial cathode. It will be noted that the second deflector 31, being insulated, is not included in the electric circuit and hence is not subject to electrolytic erosion. This part, therefore, need not be replaced as frequently as other parts more subject to wear.

Having thus described my invention, I claim:

1. A centrifugal apparatus of the character described comprising a hollow revolving cathode serving as peripheral wall for centrifuging, an axial pulp intake, and a deflector across said intake, for distributing the incoming pulp to said cathode wall, affording a corresponding internal anode in proximity to such wall, so that the centrifugal dispulsion over the cathode of value particles from pulp or the like passed through the apparatus may be effectively reinforced and aided by electric current flow between said electrodes.

2. A centrifugal apparatus of the character described comprising a hollow cathode member revolving about an upright axis and serving as peripheral wall for centrifuging, a mercury trough for supplying mercury to said cathode member, axial pulp intake and discharge means, one upstanding inside of said mercury trough to exclude the mercury therefrom and the other provided with a deflector for directing the pulp flow, and an internal anode in close proximity to said cathode wall; so that a film of mercury from said trough may be centrifugally maintained on said cathode member as its active surface while the same is revolving, and the centrifugal dispulsion over the cathode of value particles from pulp or the like passed through the narrow space between said electrodes may be effectively reinforced, and aided by the passage of electric current between the electrodes across the thin pulp stream.

3. An apparatus of the character described, comprising a closed centrifugal having inlet and discharge passages, whereby value bearing pulp may be flowed therethrough under hydrostatic pressure during rotation, an electrode mounted within the centrifugal adapted to spread the stream therein to a shallow depth over a broad area, means to include the centrifugal and electrode in a unidirectional electric circuit, and means to vary the hydrostatic pressure of the pulp stream to correspond with the grade of pulp treated to secure a maximum rate of recovery.

4. An apparatus of the character described, comprising a closed centrifugal containing a charge of amalgamating element, and having inlet and discharge means, and a deflector mounted within the centrifugal having its active surface coextensive at every point with that of the centrifugal walls and located over the discharge passage to divert material passing through the centrifugal, whereby the centrifugal and deflector may be included in a uni-directional electric circuit wherein the centrifugal is the cathode.

5. An apparatus of the character described, comprising a closed centrifugal having inlet and discharge passages, a combined electrode and deflector mounted in the centrifugal for rotation therewith, in insulated relation thereto and covering the discharge passage to divert the pulp stream passing between the centrifugal walls and electrode, and means including wiping contacts to create a uni-directional electric circuit from the electrode across the pulp stream and to the centrifugal walls.

6. An apparatus of the character described, comprising a closed centrifugal having hollow spindles through which the pulp is flowed, a deflector mounted in the centrifugal, in insulated relation thereto and covering the opening of the discharge spindle to divert the pulp stream, a commutator in communication with the deflector, and brushes engaging the commutator and centrifugal wall to include the latter and the deflector in a uni-directional electric circuit.

7. An apparatus of the character described, comprising a closed centrifugal, hollow spindles forming part thereof, to mount the same for rotation and to permit the passage of value bearing pulp through the centrifugal, an inverted cup member located over the opening of the discharge spindle and having its walls closely spaced relative to the centrifugal walls, to constitute an electrode and to divert the pulp stream, and means to include the centrifugal and the cup member in a uni-directional electric circuit during rotation of the centrifugal.

8. An apparatus of the character described comprising a cylindrical centrifuge mounted to spin around a vertical axis, an inverted cup shaped deflector enclosed within the centrifuge and rotating therewith having its side walls in closely spaced relation to the side walls of the centrifuge, a discharge duct entering the centrifuge and extending into the cup member to cause a reversing flow of material passing through the centrifuge, and means for including the centrifuge and the cup member in an electrical circuit.

9. An apparatus of the character described comprising a centrifuge mounted to spin about a vertical axis and having a discharge opening in its lower wall, a deflector member mounted within the centrifuge, a discharge duct in registration with the discharge opening and mounted in insulated relation to the centrifuge, and means for including the centrifuge and deflector in an electrical circuit.

10. An apparatus of the character described comprising a drum shaped centrifuge mounted to spin about a vertical axis and having entry and discharge conduits coinciding with the axis, an inverted cup shaped deflector enclosed within the centrifuge and having a perforated neck portion for attachment to the upper wall of the centrifuge, whereby the entering material may pass through said openings and around the space between the deflector and centrifuge walls, means insulating the deflector from the centrifuge, the bottom wall of the latter being curved to provide an annular groove affording upward deflection of the material, and a duct member coinciding with the charge opening and extending into the cup member to cause a reversing flow of the material.

In testimony whereof, I have hereunto signed my name at Philadelphia, Pennsylvania, this 28th day of April 1922.

RUSSELL THAYER.